United States Patent
Pomerantz

(10) Patent No.: US 8,688,637 B2
(45) Date of Patent: Apr. 1, 2014

(54) BOOKMARKED SYNCHRONIZATION OF FILES

(75) Inventor: Itzhak Pomerantz, Kfar Saba (IL)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 13/620,252

(22) Filed: Sep. 14, 2012

(65) Prior Publication Data

US 2013/0013559 A1  Jan. 10, 2013

Related U.S. Application Data

(63) Continuation of application No. 11/710,909, filed on Feb. 27, 2007, now Pat. No. 8,296,261.

(60) Provisional application No. 60/777,247, filed on Feb. 28, 2006.

(51) Int. Cl.
*G06F 17/30* (2006.01)

(52) U.S. Cl.
USPC .................................. 707/620; 707/E17.005

(58) Field of Classification Search
None
See application file for complete search history.

(56) References Cited

U.S. PATENT DOCUMENTS

| | | | |
|---|---|---|---|
| 5,873,109 A | 2/1999 | High | |
| 7,129,338 B1 | 10/2006 | Ota et al. | |
| 2002/0039734 A1 | 4/2002 | Hanrahan et al. | |
| 2002/0052025 A1 | 5/2002 | Thompson et al. | |
| 2002/0069218 A1* | 6/2002 | Sull et al. | 707/501.1 |
| 2003/0144984 A1 | 7/2003 | Dunbar | |
| 2003/0236895 A1 | 12/2003 | Ohkubo et al. | |
| 2004/0101292 A1 | 5/2004 | Noda | |
| 2005/0265692 A1 | 12/2005 | Kaku et al. | |
| 2006/0019256 A1 | 1/2006 | Clarke et al. | |
| 2006/0242161 A1 | 10/2006 | Ten Kate et al. | |
| 2006/0294315 A1* | 12/2006 | Iren et al. | 711/137 |

FOREIGN PATENT DOCUMENTS

| | | |
|---|---|---|
| EP | 1 463 258 A1 | 9/2004 |
| EP | 1 594 317 A1 | 9/2005 |
| EP | 1 596 594 A1 | 11/2005 |
| WO | 03/067594 | 8/2003 |
| WO | 2004/12036 A1 | 12/2004 |

* cited by examiner

*Primary Examiner* — Anteneh Girma
(74) *Attorney, Agent, or Firm* — Martine Penilla Group, LLP

(57) ABSTRACT

A file synchronization system that includes a non-volatile memory for storing at least one bookmark respective to a file; a telecommunication mechanism for receiving a new bookmark value respective to this file; and a controller operative to update the respective bookmark according to the new bookmark value; and to control presentation of the file in accordance with the updated bookmark value. A plurality of bookmarks that associate to a single file are stored in the file synchronization system, each such bookmark respective to a different user.

20 Claims, 3 Drawing Sheets

BOOKMARKED SYNCHRONIZATION OF FILES

CLAIM OF PRIORITY

This patent application is a Continuation of U.S. application Ser. No. 11/710,909, filed on Feb. 27, 2007 now U.S. Pat. No. 8,296,261, entitled "BOOKMARKED SYNCHRONIZATION OF FILES," which claims the benefit of U.S. Provisional Patent Application No. 60/777,247 filed on Feb. 28, 2006. The disclosures of these applications are incorporated by reference in their entirety.

FIELD OF THE INVENTION

The present invention relates generally to the field of synchronization of files on different devices.

BACKGROUND OF THE INVENTION

Diverse storage systems providing access to files on multiple storage devices are well known in the art of digital computing.

Microsoft Exchange Server® enables a user to work on emails in one computer and then move to another computer to continue the work, while the files on one computer are synchronized by the server to files on the other computer.

When a user is using a file on a first device and has to stop operation and move to another device to continue the operation, he typically wants to resume the operation on the other device from the exact point in the file where he stopped.

In some cases this is very easy. When writing a document or preparing a slide presentation on a first device, the user typically works until the end of the file on this device before moving to work on a second device. By asking the second device to jump to the end of the file, the user is directed to the exact place where he/she wants to resume work.

However, this is not the case in many other situations.

For example, when the user is reading a document, the synchronization does not provide a bookmark value that opens the file on a new computer from the point at which the file was last used. By "bookmark value" is meant any information that indicates the approximate current position (e.g. the address of the last-presented segment) of the user within the file upon interruption. Accordingly, a "bookmark" refers to any storage means for storing a bookmark value. By "interruption" is meant any operation that either temporarily suspends or permanently terminates presentation of a file.

In such situations, where the application allows reading and writing, the prudent user can manually create a bookmark in the text, by entering a bookmark value or a unique string of text. The user can then search for this bookmark on the new computer.

However, there are many cases where the operation of the user is "read only". For example, reading a PDF document, viewing a movie, listening to a recorded lecture, listening to music, viewing a photo album and so on are some examples of read-only operations of a user.

A prior art system keeping a bookmark for continuity of using content on different devices is taught in US Patent Application Publication No. 20050157600 to Teicher.

The Teicher application discloses a storage medium that includes a content storage portion for storing content and a bookmark storage portion for storing a bookmark value. A player plays the desired content until an ending segment is reached, and sets the bookmark value in accordance with the ending segment, so that subsequent playing, on the same player or on a different player, starts in accordance with the ending segment. The starting segment is selected either by the player or by the storage medium.

As is explicitly described in the Teicher application, the storage medium, such as a CD, must be modified to physically store a bookmark value on a portion of the storage medium itself. This is a major disadvantage, as there are many cases in which the content is stored on a standard write-once CD that cannot be modified according to the Teicher application. The Teicher invention is incapable of keeping a bookmark in such cases.

There is thus a widely recognized need for, and it would be highly advantageous to have a system that allows a user to stop his/her work on a first device at any time and resume his/her work on a second device approximately from the same position in the file, while overcoming the disadvantages of prior art techniques and in addition to prior art techniques.

SUMMARY OF THE INVENTION

Accordingly, it is a principal object of the present invention to introduce a system and method providing a bookmarked synchronization of files, thereby allowing users to stop presentation of a specific file on a first device at any time and resume presentation on a second device approximately from the same position in this file without the need to physically move the file from one presentation device to another.

The system of the present invention is operative to update an existing bookmark value respective to a file according to a new bookmark value that is received by the system separate from and independent of the content of the file and to control presentation of this file on a networked presentation device in accordance with the updated bookmark value. This is in contrast to the prior art (as disclosed in the Teicher patent application cited herein above), which requires physically carrying a storage medium, such as a multimedia card storing both the content and the bookmark, to the required presentation device.

The term "approximate position" is used herein to mean the best available information indicating the current position of the file before file presentation is stopped.

The term "presentation device" is used herein to refer to any device for typically displaying content and/or outputting a sound, such as a computer, a mobile phone, an MP4 player, an MP3 player, a DVD player, a television set, any type of speaker unit, or any type of device for presenting content of a file.

The term "controlling presentation" is used herein as a general term to mean controlling consuming, playing, and/or viewing any of the content upon the presentation device.

Optionally, the bookmark of a file is a public bookmark that is associated with a plurality of users. Alternatively, the bookmark of a file is a private bookmark that is associated with a specific user. As such, a single file can be opened at different positions on the same device for different users.

In accordance with a preferred embodiment, there is provided a file synchronization system that includes: (a) a non-volatile memory for storing at least one bookmark respective to a file; (b) a communication mechanism operative to receive a new bookmark respective to the file, so that the new bookmark is received separate from and independent of the content of the file; and (c) a controller operative to update one respective bookmark according to the new bookmark value; and to control presentation of the file in accordance with the new bookmark value.

Preferably, the controller is further operative to monitor a position of presentation of the file; and to update this one bookmark according to the position of the file.

Preferably, the file synchronization system also includes at least one presentation device, operative in accordance with the new bookmark value to present content of the file. More preferably, the file synchronization system also includes a plurality of presentation devices, such that the controller is operative to control presentation of the file in accordance with the new bookmark value on a selected presentation device. A presentation device may be a computer, a mobile phone, an MP4 player, an MP3 player, a DVD player, a television set, a speaker unit, etc. Also more preferably, the presentation device communicates with the controller via wireless link. Alternatively, the presentation device communicates with the controller via wired link.

Preferably, the communication mechanism includes a wireless communication link. Alternatively, the communication mechanism includes a wired communication link.

Preferably, a bookmark value is received from a first storage unit and content of the file is received from a second storage unit that is physically separated from the first storage unit.

Preferably, the new bookmark value of the file is associated with a specific data address within the file. Alternatively, the new bookmark value of the file is associated with a segment of the file.

Preferably, the new bookmark value is associated with a plurality of users. Alternatively, the new bookmark value is associated with a specific user.

In accordance with a preferred embodiment, there is also provided a method of providing a continuation of user experience in using a file, the method includes the steps of: (a) storing, in a non-volatile memory, at least one bookmark respective of the file; (b) receiving a new bookmark value respective to the file separately from and independently of content of the file; and (c) updating one respective bookmark according to the new bookmark value. The new bookmark value may be received via a wireless link or a wired link.

Preferably, the method also includes presenting content of the file in accordance with the new bookmark value. More preferably, the method also includes monitoring a position of presentation of the file; and updating the one respective bookmark according to the position of the file. The content on the presentation device is presented either via a wireless link or a wired link.

Preferably, the method also includes the steps of receiving content of the file, such that the new bookmark value and the content of the file are received from different storage units that are physically separated from each other.

Preferably, the method also includes the step of defining the new bookmark value as to associate with a specific data address within the file. Alternatively, the method also includes the step of defining the new bookmark value as to associate with a segment of the file.

Preferably, the method also includes the step of defining the new bookmark value as to associate with a plurality of users. Alternatively, the method includes the step of defining the new bookmark value as associate with a specific user.

In accordance with a preferred embodiment, there is further provided a file synchronization system that includes: (a) a content storage area for storing content of a file; and (b) a bookmark storage area for storing a plurality of bookmarks of the file, each bookmark respective to a different user.

Preferably, the file synchronization system also includes a controller that is operative to control presentation of the file for a specific user in accordance with the value of the respective bookmark of this specific user.

Preferably, the file synchronization system also includes at least one presentation device for presenting the content of the file in accordance with a value of a selected bookmark.

In accordance with a preferred embodiment, there is further provided a method of providing a continuation of user experience in using a file, the method includes the steps of: (a) storing content of the file, in a non-volatile memory; and (b) separately from the file, storing a plurality of bookmarks of the file, each bookmark respective to a different user.

Preferably, the method also includes the step of presenting the content of the file for a specific user in accordance with a value of the respective bookmark of this specific user.

Some examples of the ways in which users can use the present invention are provided as follows:

A user can view a specific file (e.g. watch a movie, use content of a file, etc.) on his computer in his living room, then retire to bed and continue to view this file on a networked bedroom TV from the point where the user stopped without carrying any physical media with him/her from the living room to the bedroom.

A user can use a specific file (e.g. watch a movie, use content of a file, etc.) on his computer in his living room, then hurry to work, take a taxi and continue to run this file on his networked portable device (e.g. DVD player) from the point where he stopped without carrying any physical media with him from home to the taxi, and without disturbing another user from continuing to watch the movie at home.

A user can run a specific file (e.g. watch a movie, use content of a file, etc.) on a computer and log out at a first time period. Another user can log on to the same computer, run the same file, and then log out at a second period of time. Then the first user can come back and log on to this computer and continue to run this file on this same computer from the first time period where he had stopped.

A user can read an e-book in the library, and then carry the e-book home while sending a bookmark corresponding to this e-book and this user to a private networked computer for continuing to read this e-book on his home computer from the page where he stopped.

Additional features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding sections or elements throughout, and in which.

DETAILED DESCRIPTION OF THE PREFERRED EMBODIMENTS

Figure 1:
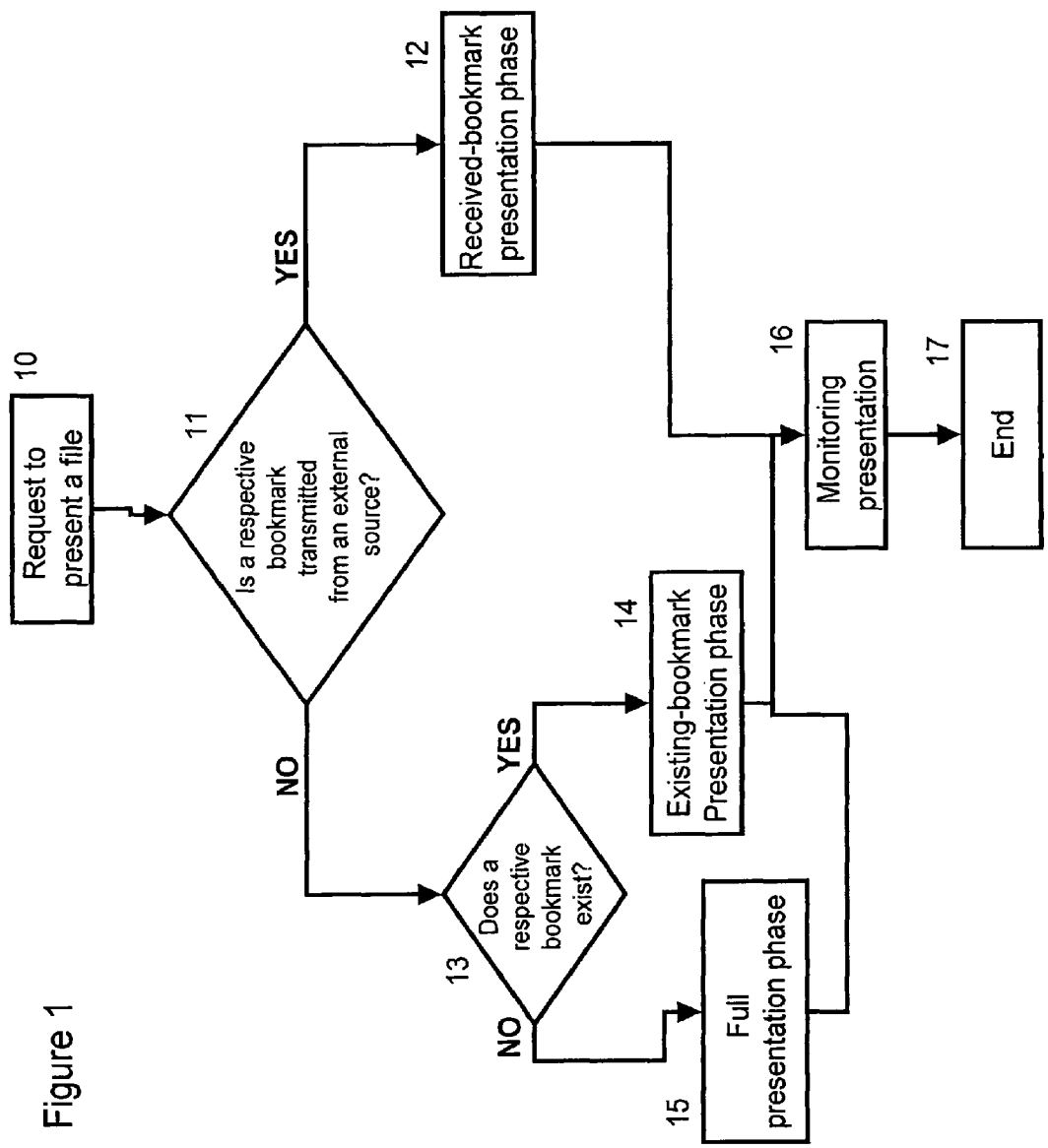
FIG. 1 is a flow chart of one embodiment of a method of the present invention.

The present invention is of a system and method providing a bookmarked synchronization of files.

The system of the present invention includes a file synchronization device that is operative to update an existing bookmark of the file synchronization device in accordance with another (typically more updated) bookmark value that is transmitted to the file synchronization device separately and independently from the content of the file and to control presentation of the file on a presentation device in accordance with the value of the updated bookmark. Such system allows users to stop presentation of a specific file on a first presentation device at any time and resume presentation on a second presentation device approximately from the same position in this file without the need to physically move the file from one presentation device to another.

The bookmark synchronization is effected using wireless communication between two networked devices. Alternatively or additionally, the bookmark synchronization is effected using wired connection. This can be achieved by carrying a file on a first storage medium (such as a CD) and storing a corresponding bookmark on a portable flash disk such as the DiskOnKey™ flash memory product, available from msystems Ltd., Kefar Sava, Israel, so that the file itself and its corresponding bookmark are separately and independently provided to the designated presentation device.

A bookmark value is received, by the file synchronization device, as an indication of the approximate position of a corresponding file. In case a file is transmitted to the file synchronization device or presented by the system's presentation device as streaming content, then the bookmark may include an exact data address. However, in case the file is received or presented by the system in data segments, then the accuracy of the bookmark value is limited to the length of the data segment that is stored—typically a sector, but possibly other size of segment. For example, digital content of a movie can be thought of as divided into 1-second segments, addressed by counting the displaying time in seconds from the beginning of the movie. Alternative segmentation and addressing monitoring techniques relate to the way the digital content is organized in physical and logical blocks and are well known in the art.

Upon request, the presentation of the file is resumed from the bookmark value (e.g. from the beginning of the current segment), such that a portion of content may optionally be replayed.

The system of the present invention includes means for keeping track of the sequential number of the sector being read. When the system stops presenting the file on a specific presentation device, the sequential number of the current sector is stored in an internal memory (typically in a list of updated bookmarks) of the file synchronization device in association with the content of the file, so that the sequential number of the current sector serves as a bookmark value. When bookmark synchronization is applied between two presentation devices, the sequential number of the current sector of this file is transmitted to the other presentation device and presentation of the file is resumed, on the other presentation device, from that current sector (i.e. the address of the last-presented segment).

Optionally and preferably, the bookmark is a private bookmark that is received (or created) by the system with respect to both a presented file and a specific user using this file. As such, a specific file can be presented on a same presenting device starting from different positions in the file (for different users). This can be implemented by creating and updating the bookmark with respect to both the presented file and an identification parameter (e.g. current user name) of the user using this file. In response to a request made by a user to resume presentation of a specific file (e.g. to play the content of the file, to view the content of the file, etc.), the identification parameter is used to retrieve the bookmark for this user and start presenting content starting from the bookmark value.

Alternatively, if the system includes a device that does not log the user in (for example a DVD player), then the system keeps track of the approximate position of the file without attributing this positioning to a specific user.

Preferably but not limited to, the bookmark is updated each time the user interrupts presentation of this file. Optionally, the bookmark is updated periodically during the presentation of the file (e.g. with every change of the current segment of the file).

Referring now to FIG. 1, there is shown a flow chart of one embodiment of a method of the present invention. At the initial step 10, a request is made by a user to present content of a specific file on a presentation device. The file can either be stored on the presentation device itself or provided to the presentation device, for example, by inserting a CD.

At the next step 11, it is verified whether a new bookmark value has been recently received by the file synchronization device from an external source with respect to this specific file (and optionally with respect to the specific user).

In the affirmative phase, a received-bookmark presentation phase is entered (step 12). Step 12 includes presenting the content of the file in accordance with the bookmark value of the received bookmark and adding the received bookmark to the system. In case a bookmark does not exist in the system with respect to this file, the received bookmark is stored in the system in a list of updated bookmarks in association with the file. In case such a bookmark already exists in the system, the existing bookmark is updated according to the bookmark value of the newly received bookmark. The method then proceeds to step 16.

However in the negative case, it is determined whether a bookmark is stored in the system with respect to this file (step 13). In case such a bookmark is stored—an existing-bookmark presentation phase is entered, in which the content of the file is presented in accordance with the bookmark value of the stored bookmark. In case such a bookmark is not stored—a full presentation phase is entered, in which the file is presented from the beginning (step 15). Following step 14 or step 15, the method proceeds to step 16.

At step 16, monitoring the current position of file presentation is effected. If at any point of time file presentation is interrupted—the respective bookmark is updated at the approximate point of interruption. Note that monitoring current position of presentation can be implemented, for example, by updating a variable in accordance with the current segment of the file. As an example, a slide show or a Power Point presentation is a typical example of a file that is typically presented forward and backwards, such that the current position of this file constantly changes.

At the last step 17, the method is completed.

Figure 2:
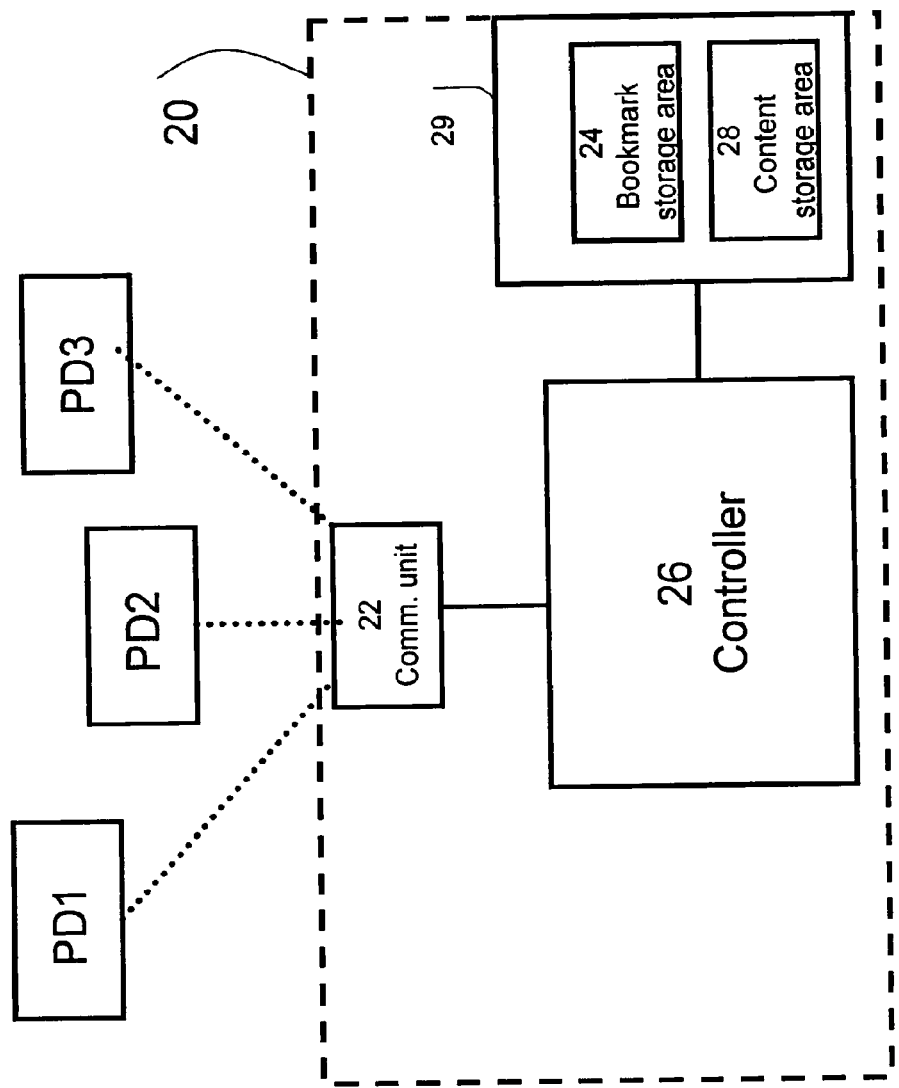
FIG. 2 is a block diagram of a system of the present invention.

Referring to FIG. 2, there is shown a block diagram of a system of the present invention including a file synchronization device 20 that is connected to a plurality of presentation devices PD1, PD2, PD3. Presentation devices PD1, PD2, PD3 may be any type of device for presenting content of a file, such as a computer, a DVD player, a television set, a speaker unit, etc.

A bookmark value is transmitted to the file synchronization device 20 with respect to a specific file via a communication unit 22. The transmitted bookmark is then updated in a list of updated bookmarks of a bookmark storage area 24 of a storage area 29. This allows a user to read an e-book on networked presentation device PD1 in the library, and then to send a copy of the e-book including a corresponding bookmark value to networked presentation device PD2 (e.g. home computer) for continuing to read this e-book on his home computer from the page where he stopped in the library. Note that the files are either stored in a content storage area 28 of a storage area 29 or are, alternatively, transmitted to the system using communication unit 22.

Communication unit 22 is further operative to communicate with either one of presentation devices PD1, PD2, PD3. Communication between communication unit 22 and the presentation devices is effected either wirelessly or wired. This allows a user to use a specific file (e.g. watch a movie, use content of a file, etc.) on presentation device PD1 computer in his living room, then hurry to work, take a taxi and continue to run this file on presentation device PD2 (e.g. DVD player) from the point where he stopped without carrying any physical media with him from home to the taxi, and without disturbing another user from continuing to watch the movie on presentation device PD1.

A controller 26, responsive to communication unit 22, controls file presentation on either one of presentation devices PD1, PD2, PD3, in accordance with a corresponding bookmark value.

Preferably but not limited to, controller 26 also monitors the current position of file presentation (for example, by updating a variable in accordance with the current segment of the presented file). Upon interruption in the presentation of the file on any presentation device, controller 26 updates the bookmark accordingly in the list of updated bookmarks of bookmark storage area 24.

Figure 3:
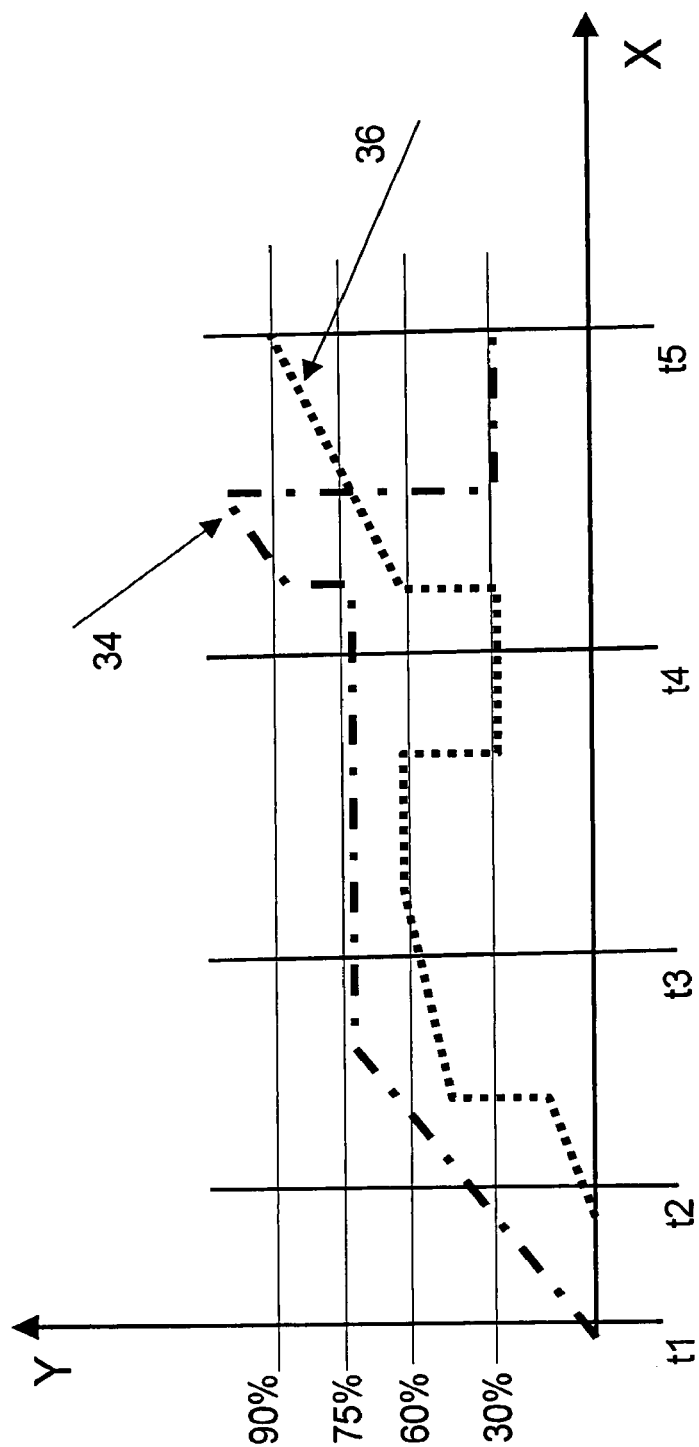
FIG. 3 shows a time diagram example of a working progress of two different users using the same file on the same device.

Referring to FIG. 3, there is graphically shown a time diagram example of a working progress of two different users using the same file on the same device. The x-axis indicates time and the Y-axis indicates position, in percentage, of the presented file.

As the system can keep track of the approximate position of the file, and as the file is presented when a specific user is logged on to one of the devices of the system, the system can keep a bookmark with respect to the position of each user using the file.

In accordance with the times diagram of FIG. 3, the working progress of the first user is numbered 34 and the working progress of the second user is numbered 36. The first user starts to use the file at a time t1. The second user starts to use this same file at a slightly later time t2.

At a time t3—the working progress of the first user 34 shows that the first user has progressed monotonically to the point of 75% of the file and the working progress of the second user 26 shows that the second user has progressed monotonically to the point of 60% of the file. Accordingly, at time t3 a bookmark associated with the first user is set to 75% and a bookmark associated with the second user is set to 60%.

At a time t4—the working progress of the first user 34 shows that the first user has not progressed further in the file (still in the point of 75%) and the working progress of the second user 36 shows that the user has gone back to the point of 30% in the file. Accordingly, at time t4 the bookmark associated with the first user is updated to 75% and the bookmark associated with the second user is updated to 30%.

At a time t5—the working progress of the first user 34 shows that the first user drew back in the file to the point of 30% and the working progress of the second user 36 shows that the user progressed in the file to the point of 90%. Accordingly, at time interval t5 the bookmark associated with the first user is updated to 30% and the bookmark associated with the second user is updated to 90%.

Having described the system of the present invention with regard to certain specific embodiments thereof, it is to be understood that the description is not meant as a limitation, since further modifications will now suggest themselves to those skilled in the art, and it is intended to cover such modifications as fall within the scope of the appended claims.

What is claimed is:

1. A file synchronization system comprising:
    a file synchronization device having,
        a memory for storing a file and at least one bookmark respective to said file, the bookmark indicating a position of presentation within the file,
        a communication mechanism operative to receive a new bookmark value from a first networked presentation device, said new bookmark value respective to said file being generated in response to interruption of presentation of the file, and based on a monitored current position of presentation of said file stored in said memory when presentation was interrupted, said new bookmark value received separate from and independent of content of said file,
        a controller operative to update one of said respective at least one bookmark according to said new bookmark value; and to control presentation of said file in accordance with said new bookmark value; and
    a second networked presentation device operative to generate a request to present content of said file, and when receiving said new bookmark value from said controller, operative in accordance with said new bookmark value to present content of said file stored in said memory from the current position of presentation for said file;
    wherein the controller is operative, upon receiving the request from the second networked presentation device, to verify whether the new bookmark value has been received, and if not, to control presentation of said file at the second networked presentation device in accordance with the one of said respective at least one bookmark.

2. The file synchronization system of claim 1, wherein presentation of said file is defined by streaming content of the file from the memory to a respective one of the networked presentation devices.

3. The file synchronization system of claim 1,
    wherein the monitored current position of presentation of said file is determined based on keeping track of an address of a data segment being read; and
    wherein the new bookmark value is defined by the address of the data segment being read when presentation was interrupted on the first networked presentation device.

4. The file synchronization system of claim 3, wherein each data segment is defined as a sector of the memory.

5. The file synchronization system of claim 1, wherein the at least one bookmark respective to said file and the new bookmark value are associated with an identification parameter of a user.

6. The file synchronization system of claim 5, wherein the controller is further operative to use the identification parameter to retrieve the new bookmark value in response to receiving the request to present content of said file from the second networked presentation device.

7. The file synchronization system of claim 5, wherein the identification parameter is a username.

8. The file synchronization system of claim 1, wherein said controller is further operative to continue to monitor the current position of presentation of said file, and to periodically update said one bookmark according to said current position of presentation.

9. The file synchronization system of claim 1, wherein said controller is further operative to continue to monitor the current position of presentation of said file; and to update said one bookmark according to said position of said file when presentation of said file is interrupted, wherein interrupted includes stopping presentation of said file, logging out from said second networked presentation device, or interrupting presentation of said file.

10. The file synchronization system of claim 1, wherein each said at least one networked presentation device is selected from the group consisting of: a computer, a mobile phone, an MP4 player, an MP3 player, a DVD player, a television set, a speaker unit, or a portable device.

11. The file synchronization system of claim 1, wherein said communication mechanism includes a wireless communication link or a wired communication link.

12. The file synchronization system of claim 1, wherein the content of the file defines one or more of a document, a movie, a recording, music, a photo album, an e-book, or a slideshow.

13. A method of providing a continuation of user experience in using a file, the method comprising the steps of:
   (a) storing, in a memory, the file and at least one bookmark respective of the file, the bookmark indicating a position of presentation within the file;
   (a1) receiving from a second networked presentation device a request to present content of the file;
   (b) verifying whether a new bookmark value has been received from a first networked presentation device, the new bookmark value respective to the file separately from and independently of content of the file, the new bookmark value being generated in response to interruption of presentation of the file, and based on a monitored current position of the file when presentation was interrupted, said new bookmark value received;
   (c) if a new bookmark value has been received, then updating one of said respective at least one bookmark stored in the memory according to said new bookmark value, and at the second networked presentation device, presenting content of the file stored in the memory at the current position of presentation for the file as was present in the first networked presentation device in accordance with said new bookmark value;
   (d) if a new bookmark value has not been received, then at the second networked presentation device, presenting content of the file stored in the memory at the current position of presentation in accordance with the one of said respective at least one bookmark.

14. The method of claim 13 further comprising the steps of:
   (e) continuing to monitor the current position of presentation of the file stored in the memory; and
   (f) re-updating said one respective bookmark according to said current position of presentation of the file when presentation of the file is interrupted, wherein interrupted includes stopping presentation of said file, logging out from said second networked presentation device, or interrupting presentation of said file.

15. The method of claim 13 further comprising the step of:
   (e) receiving content of the file, such that said receiving of said new bookmark value and said receiving of said content is effected from different storage units physically separated from each other.

16. The method of claim 13 further comprising the step of:
   (e) defining said new bookmark value as to associate with a specific data address within the file.

17. The method of claim 13 further comprising the step of:
   (e) defining said new bookmark value as to associate with a segment of the file.

18. The method of claim 13 further comprising the step of:
   (e) defining said new bookmark value as to associate with a plurality of users, wherein said new bookmark value based on the current position of the file when presentation was interrupted by each user.

19. The method of claim 13 further comprising the step of:
   (e) defining said new bookmark value as to associate with a specific user.

20. A file synchronization system comprising:
   a file synchronization device defined on a portable flash disk having
   a content storage area for storing content of a file,
   a bookmark storage area for storing a plurality of bookmarks of said file from a first networked presentation device, each said bookmark respective to a different user and indicating a position of presentation within the file, and
   a controller operative to control presentation of said file for a specific said user in accordance with a value of said respective bookmark of said specific user based on a monitored current position of presentation of said file when presentation was interrupted; and
   a second networked presentation device, for presenting said content of said file in accordance with a value of a selected one of said bookmarks from the current position of presentation for said file;
   wherein the controller is operative, upon receiving a request to present content of said file from the second networked presentation device, to verify whether a new bookmark value has been recently received for the specific said user from the first networked presentation device, and if so, to control presentation of said file for the specific said user at the second networked presentation device in accordance with the new bookmark value, the new bookmark value being generated in response to interruption of presentation of the file, and based on a monitored current position of the file when presentation was interrupted.

* * * * *